United States Patent
Daily et al.

(10) Patent No.: US 7,028,998 B2
(45) Date of Patent: Apr. 18, 2006

(54) STABILIZER BAR

(75) Inventors: Timothy H. Daily, Grayslake, IL (US);
Jiri Pazdirek, Schaumburg, IL (US);
Robert G. Budzyn, Elgin, IL (US)

(73) Assignee: MacLean-Fogg Company, Mundelein, IL (US)

( * ) Notice: Subject to any disclaimer, the term of this patent is extended or adjusted under 35 U.S.C. 154(b) by 194 days.

(21) Appl. No.: 10/378,749

(22) Filed: Mar. 4, 2003

(65) Prior Publication Data

US 2003/0127786 A1 Jul. 10, 2003

Related U.S. Application Data

(63) Continuation of application No. 09/846,141, filed on Apr. 30, 2001.

(51) Int. Cl.
*F16C 7/02* (2006.01)

(52) U.S. Cl. .................. 267/273; 267/148; 267/149; 267/154; 280/689

(58) Field of Classification Search .................. 256/154, 256/273, 148, 144, 149; 280/689
See application file for complete search history.

(56) References Cited

U.S. PATENT DOCUMENTS

| | | |
|---|---|---|
| 706,194 A | 5/1902 | McCarthy |
| 735,611 A | 1/1903 | Steinberger |
| 1,029,207 A | 6/1912 | Megahan |
| 1,038,473 A | 9/1912 | Alsberg |
| 1,116,303 A | 11/1914 | Locke |
| 1,167,125 A | 1/1916 | Sloper |
| 1,170,723 A | 2/1916 | Allerding |
| 1,516,585 A | 11/1924 | Austin |

(Continued)

FOREIGN PATENT DOCUMENTS

| | | |
|---|---|---|
| CH | 659 907 A5 | 2/1987 |
| EP | 0 510 397 B1 | 7/1995 |
| EP | 0 709 862 A1 | 5/1996 |
| FR | 2670255 A1 | 6/1992 |

OTHER PUBLICATIONS

S&C Fuse Cutouts—Type XS, Oct. 29, 2001, 1 page.
MacLean Molded Products, Inc., Quoatation No. 109–470, Aug. 8, 2001, 2 pages.
MacLean Molded Products, Inc., Quoatation No. 109–471, AUg. 8, 2001, 2 pages.
MacLean Molded Products, Inc., Quoatation No. 109–472, AUg. 8, 2001, 2 pages.
Cutout Insulators Capacity and Scheduling Estimates for 2002, Victor Almgren, Jun. 12, 2002, 1 page
Thomas G. Gustavsson, Silicone Rubber Insulators – Impacts of material formulation in coastal environment, Apr. 2002, pp. 1–83, Göteborg, Sweden.

(Continued)

*Primary Examiner*—Matthew C. Graham
(74) *Attorney, Agent, or Firm*—Dana Andrew Alden

(57) ABSTRACT

A composite support comprising, a composite tube that is provided with an outer diameter and includes a first fiber layer including a resin and glass fibers that have been wound around a mandrel, a second fiber layer including glass fibers that have been wound around the first fiber layer, and an outermost fiber layer including glass fibers that is located around the second fiber layer, a housing that is at least in part spirally shaped and located around at least a portion of the composite tube, a plurality of fittings, wherein at least one of the fittings includes an aluminum and an anchoring surface, and the anchoring surface is provided with a diameter that is smaller than the outer diameter of the composite tube and secures, at least in part, the fitting to the composite tube, so that, after assembly, the fitting and the composite tube are generally coaxial.

27 Claims, 2 Drawing Sheets

U.S. PATENT DOCUMENTS

| | | | |
|---|---|---|---|
| 1,691,330 A | 11/1928 | Austin |
| 1,717,287 A | 6/1929 | Warren et al. |
| 1,730,327 A | 10/1929 | Kempton |
| 1,730,716 A | 10/1929 | Austin |
| 1,768,948 A | 7/1930 | Baum |
| 1,865,134 A | 6/1932 | Plimpton |
| 1,869,397 A | 8/1932 | Stroup |
| 1,894,292 A | 1/1933 | Cramer |
| 1,896,740 A | 2/1933 | Cosseboom |
| 1,942,294 A | 1/1934 | Halton |
| 1,967,654 A | 7/1934 | Austin |
| 1,980,476 A | 11/1934 | Earle |
| 2,017,519 A | 10/1935 | Waldron |
| 2,049,552 A | 8/1936 | Walsh |
| 2,155,848 A | 4/1939 | Taylor |
| 2,174,476 A | 9/1939 | Pittman et al. |
| 2,221,582 A | 11/1940 | Hanna |
| 2,246,193 A | 6/1941 | Smith, Jr. |
| 2,378,109 A | 6/1945 | Schultz |
| 2,386,112 A | 10/1945 | Harkins |
| 2,593,426 A | 4/1952 | Fahnoe |
| 2,606,954 A | 8/1952 | Baker |
| 2,625,498 A | 1/1953 | Koch |
| 2,653,884 A | 9/1953 | Hussey et al. |
| 2,660,644 A | 11/1953 | Murray et al. |
| 2,723,705 A | 11/1955 | Collins |
| 2,732,423 A | 1/1956 | Morrison |
| 2,741,294 A | 4/1956 | Pancherz |
| 2,744,043 A | 5/1956 | Ramberg |
| 2,747,616 A | 5/1956 | De Ganahl |
| 2,776,332 A | 1/1957 | Von Cron |
| 2,789,154 A | 4/1957 | Peterson |
| 2,821,604 A | 1/1958 | Wallace |
| 2,848,133 A | 8/1958 | Ramberg |
| 2,858,992 A | 11/1958 | Wentz |
| 2,883,448 A | 4/1959 | Hermann |
| 2,900,292 A | 8/1959 | Coleman, Jr. |
| 2,905,582 A | 9/1959 | Coleman, Jr. |
| 2,924,643 A | 2/1960 | Barnes |
| 2,961,518 A | 11/1960 | Hermann |
| 2,997,529 A | 8/1961 | Fink |
| 3,043,120 A | 7/1962 | Waldron |
| 3,057,509 A | 10/1962 | Bernd |
| 3,063,891 A | 11/1962 | Boylan et al. |
| 3,066,180 A | 11/1962 | Virsberg |
| 3,068,133 A | 12/1962 | Cilker et al. |
| 3,110,758 A | 11/1963 | Meier |
| 3,111,451 A | 11/1963 | Peters |
| 3,116,386 A | 12/1963 | Sperzel |
| 3,134,164 A | 5/1964 | Hocks |
| 3,134,874 A | 5/1964 | Cameron |
| 3,152,392 A | 10/1964 | Coppack et al. |
| 3,159,709 A | 12/1964 | Austin et al. |
| D201,133 S | 5/1965 | Vose |
| 3,192,622 A | 7/1965 | Bannerman |
| 3,198,878 A | 8/1965 | Kaczerginski |
| 3,218,517 A | 11/1965 | Sankey |
| 3,235,688 A | 2/1966 | Fink et al. |
| 3,249,719 A | 5/1966 | Misare et al. |
| 3,260,796 A | 7/1966 | Hirtzer |
| 3,261,910 A | 7/1966 | Lacquier |
| 3,282,757 A | 11/1966 | Brussee |
| 3,296,366 A | 1/1967 | Bronikowski |
| 3,307,137 A | 2/1967 | Tordoff et al. |
| 3,323,097 A | 5/1967 | Tordoff |
| 3,325,584 A | 6/1967 | Herzig |
| 3,345,483 A | 10/1967 | Leonard et al. |
| 3,358,076 A | 12/1967 | Rebosio |
| 3,363,174 A | 1/1968 | Hudson et al. |
| 3,377,420 A | 4/1968 | Brown et al. |
| 3,387,839 A | 6/1968 | Miller et al. |
| 3,429,758 A | 2/1969 | Young |
| 3,448,343 A | 6/1969 | Kershaw, Jr. |
| 3,449,182 A | 6/1969 | Wiltshire |
| 3,468,740 A | 9/1969 | Kaczerginski |
| 3,470,051 A | 9/1969 | Meyer |
| 3,485,940 A | 12/1969 | Perry et al. |
| 3,506,833 A | 4/1970 | Von Willisen |
| 3,509,267 A | 4/1970 | Jensen |
| 3,512,118 A | 5/1970 | Leonard |
| 3,513,425 A | 5/1970 | Arndt |
| 3,522,366 A | 7/1970 | Lambeth |
| 3,553,978 A | 1/1971 | Williams |
| 3,567,541 A | 3/1971 | Kaczerginski |
| 3,594,676 A | 7/1971 | Misare |
| 3,611,240 A | 10/1971 | Mikulecky |
| 3,638,455 A * | 2/1972 | Francois ............... 64/23 |
| 3,648,211 A | 3/1972 | McKeithan |
| 3,666,589 A | 5/1972 | Alderfer |
| 3,686,603 A | 8/1972 | Lockie et al. |
| 3,686,604 A | 8/1972 | Link et al. |
| 3,715,252 A | 2/1973 | Fairbairn |
| 3,735,019 A | 5/1973 | Hess et al. |
| 3,746,424 A | 7/1973 | Hermstein |
| 3,784,235 A | 1/1974 | Kessler et al. |
| 3,794,751 A | 2/1974 | Farmer et al. |
| 3,802,989 A | 4/1974 | Huber et al. |
| 3,808,352 A | 4/1974 | Johnson |
| 3,810,060 A | 5/1974 | Hubbard |
| 3,826,025 A | 7/1974 | Elliott |
| 3,839,593 A | 10/1974 | Meier et al. |
| 3,850,722 A | 11/1974 | Kreft |
| 3,859,704 A | 1/1975 | Nasson |
| 3,868,615 A | 2/1975 | Haubein et al. |
| 3,898,372 A | 8/1975 | Kalb |
| 3,952,848 A | 4/1976 | Walker et al. |
| 3,979,554 A | 9/1976 | Fesik et al. |
| 4,011,537 A | 3/1977 | Jackson, Jr. et al. |
| 4,045,604 A | 8/1977 | Clabburn |
| 4,053,707 A | 10/1977 | Ely et al. |
| 4,138,141 A * | 2/1979 | Andersen ............... 280/689 |
| 4,198,538 A | 4/1980 | Lusk |
| 4,212,696 A | 7/1980 | Lusk et al. |
| 4,217,466 A | 8/1980 | Kuhl |
| 4,246,696 A | 1/1981 | Bauer et al. |
| 4,267,402 A | 5/1981 | Reighter |
| 4,296,276 A | 10/1981 | Ishihara et al. |
| 4,308,566 A | 12/1981 | Imataki et al. |
| 4,316,204 A | 2/1982 | Inagaki et al. |
| 4,331,833 A | 5/1982 | Pargamin et al. |
| 4,373,113 A | 2/1983 | Winkler et al. |
| 4,380,483 A | 4/1983 | Kliger |
| 4,386,250 A | 5/1983 | Nicoloso |
| 4,390,745 A | 6/1983 | Bottcher et al. |
| 4,392,714 A | 7/1983 | Brüggendieck et al. |
| 4,409,428 A | 10/1983 | Dey et al. |
| 4,414,527 A | 11/1983 | Biller |
| 4,440,975 A | 4/1984 | Kaczerginski |
| 4,490,006 A | 12/1984 | Lidholt |
| 4,491,687 A | 1/1985 | Kaczerginski et al. |
| 4,540,968 A | 9/1985 | Kato et al. |
| 4,546,341 A | 10/1985 | McNaghten et al. |
| 4,609,798 A | 9/1986 | Nicoloso |
| 4,610,033 A | 9/1986 | Fox, Jr. |
| 4,613,727 A | 9/1986 | Salanki et al. |
| 4,653,846 A | 3/1987 | Yamazaki et al. |
| 4,661,184 A | 4/1987 | Kläy |
| 4,710,847 A | 12/1987 | Kortschinski et al. |
| 4,714,800 A | 12/1987 | Atkins et al. |
| 4,717,237 A | 1/1988 | Austin |
| 4,772,090 A | 9/1988 | Atkins et al. |

| | | |
|---|---|---|
| 4,774,488 A | 9/1988 | Field |
| 4,802,731 A | 2/1989 | Maschek et al. |
| 4,810,836 A | 3/1989 | Shinoda et al. |
| 4,827,081 A | 5/1989 | Seabourne et al. |
| 4,833,278 A | 5/1989 | Lambeth |
| 4,842,298 A * | 6/1989 | Jarvis .................. 267/154 |
| 4,864,455 A | 9/1989 | Shimomura et al. |
| 4,870,387 A | 9/1989 | Harmon |
| 4,909,428 A | 3/1990 | Mermet-Guyennet |
| 4,919,217 A | 4/1990 | Mima et al. |
| 4,921,322 A | 5/1990 | Seike et al. |
| 4,945,333 A | 7/1990 | Stroud et al. |
| 4,984,860 A | 1/1991 | Seike et al. |
| 5,029,969 A | 7/1991 | Seike et al. |
| 5,116,172 A | 5/1992 | Koster |
| 5,120,032 A * | 6/1992 | Smith .................. 207/273 |
| 5,128,648 A | 7/1992 | Brandi |
| 5,136,680 A | 8/1992 | Seike et al. |
| 5,191,311 A | 3/1993 | Webb et al. |
| 5,220,134 A | 6/1993 | Novel et al. |
| 5,233,132 A | 8/1993 | Soucille |
| 5,300,912 A | 4/1994 | Tiller et al. |
| 5,374,780 A | 12/1994 | Pazdirek |
| 5,389,742 A | 2/1995 | Clabburn et al. |
| 5,406,033 A | 4/1995 | Pazdirek |
| D360,399 S | 7/1995 | Tillery et al. |
| 5,516,117 A | 5/1996 | Rangel |
| 5,534,858 A | 7/1996 | Tinkham |
| 5,540,991 A | 7/1996 | Hayakawa et al. |
| 5,559,488 A | 9/1996 | Hassler et al. |
| 5,563,379 A | 10/1996 | Kunieda et al. |
| 5,594,827 A | 1/1997 | Joulie et al. |
| 5,633,478 A | 5/1997 | Ishino |
| 5,803,553 A | 9/1998 | Wei |
| 5,877,453 A | 3/1999 | Hill |
| 5,885,680 A | 3/1999 | Levillain et al. |
| 5,921,591 A | 7/1999 | Argent |
| 5,925,855 A | 7/1999 | Denndorfer |
| 5,945,636 A | 8/1999 | Sakich et al. |
| 5,973,272 A | 10/1999 | Levillain et al. |
| 5,986,216 A | 11/1999 | Krause |
| 6,031,186 A | 2/2000 | Sakich et al. |
| 6,050,612 A | 4/2000 | Wolterman |
| 6,065,207 A | 5/2000 | Fuji |
| 6,070,584 A | 6/2000 | Bergstrom |
| 6,116,113 A | 9/2000 | Pazdirek et al. |
| 6,318,686 B1 | 11/2001 | No |
| 6,593,842 B1 | 7/2003 | Haynam et al. |
| 6,702,975 B1 | 3/2004 | Windmar et al. |
| 6,767,036 B1 | 7/2004 | Barker, Jr. et al. |
| 2002/0018745 A1 | 2/2002 | Haynam |
| 2002/0079703 A1 | 6/2002 | Barker, Jr. et al. |

OTHER PUBLICATIONS

Instrument Transformers, Dec. 2000, pp. 1–12, ABB Switchgear AB.

Outdoor Instrument Transformers Buyer's Guide, Feb. 2003, pp. 1–60, ABB Power Technologies.

Silicone rubber in outdoor insulators, Sep. 1998, pp. 1–4, ABB Switchgear AB.

New ABB Factory Signals Long-Term Commitment to Hollow Composite Insulators, Insulator News and Market Reports, May/Jun. 1998, pp. 1–7.

Axicom® More than just a replacement for porcelain, undated, pp. 1–4, Axicom AG.

Composite Hollow Insulator Design Book, undated, pp. 1–7, Axicom.

Cevolit® components. Less weight. Greater Dependability, undated, pp. 1–4, Axicom AG.

* cited by examiner

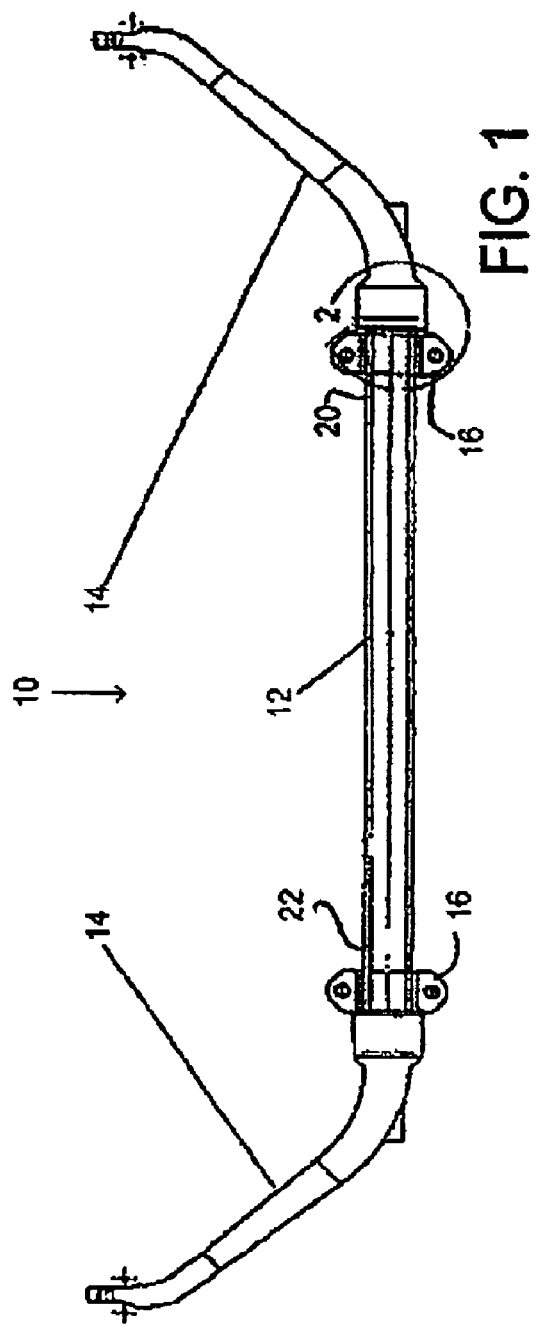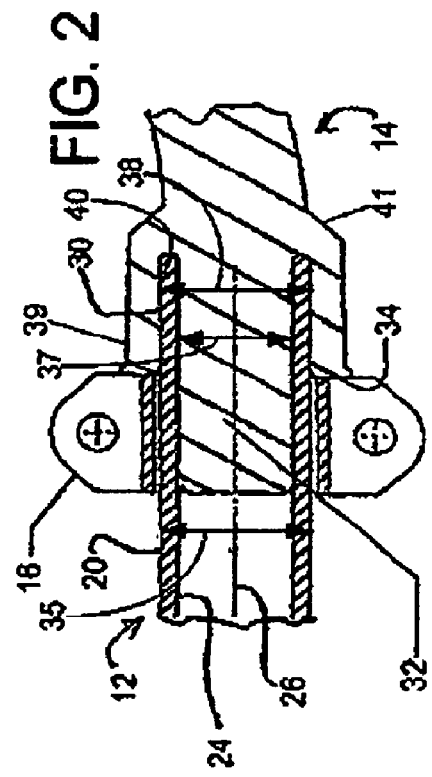

STABILIZER BAR

This is a continuation of application Ser. No. 09/846,141, filed Apr. 30, 2001.

BACKGROUND OF THE INVENTION

The present invention relates to improved composite supports.

SUMMARY OF THE INVENTION

The scope of the present invention is defined solely by the appended claims, and is not affected to any degree by the statements within this summary. Briefly stated, a composite support comprising, a composite tube that is provided with an outer diameter and includes a first fiber layer including a resin and glass fibers that have been wound around a mandrel, a second fiber layer including glass fibers that have been wound around the first fiber layer, and an outermost fiber layer including glass fibers that is located around the second fiber layer, a housing that is at least in part spirally shaped and located around at least a portion of the composite tube, a plurality of fittings, wherein at least one of the fittings includes an aluminum and an anchoring surface, and the anchoring surface is provided with a diameter that is smaller than the outer diameter of the composite tube and secures, at least in part, the fitting to the composite tube, so that, after assembly, the fitting and the composite tube are generally coaxial.

BRIEF DESCRIPTION OF THE DRAWINGS

FIG. 1 is an overall view of a composite support that incorporates a preferred embodiment of this invention.

FIG. 2 is an enlarged view in partial section of the encircled region of FIG. 1.

DETAILED DESCRIPTION OF THE PRESENTLY PREFERRED EMBODIMENTS

Figure 3:
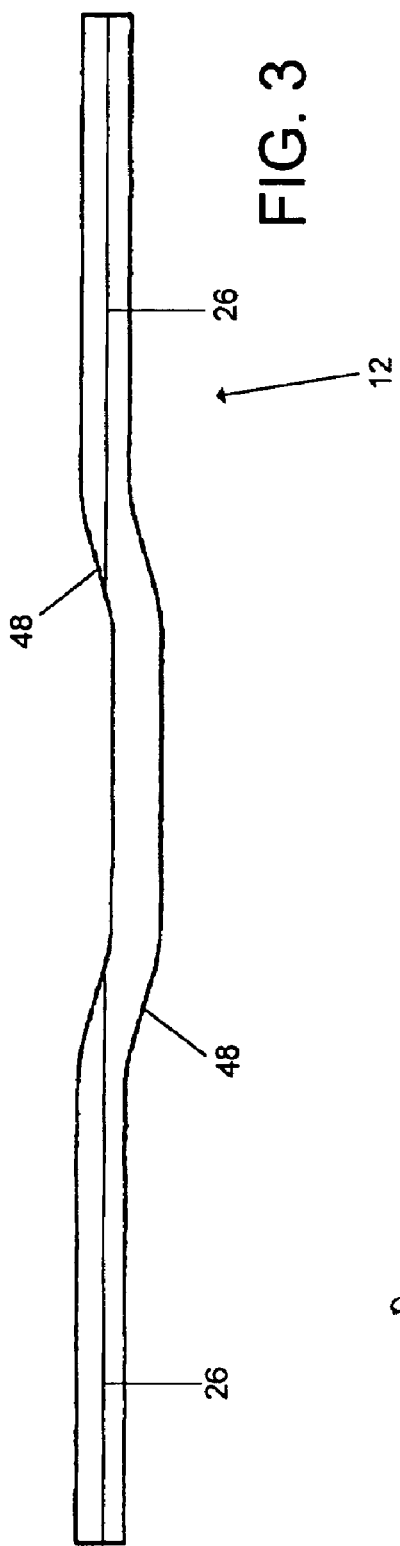
FIG. 3 is a plan view of an alternative composite tube suitable for use in the composite support of this invention.

Turning now to the drawings, FIG. 1 shows an overall view of a composite support 10 that incorporates a preferred embodiment of this invention. The composite support 10 includes a composite tube or rod, depicted at 12, and a pair of fittings 14. Each of the fittings 14 is secured to a respective end of the composite tube 12 as described below. The composite support 10 is located in place by a pair of clamps 16. Each of the clamps 16 captures a respective end of the composite tube 12 immediately inboard of a respective one of the fittings 14. In use, the ends of the fittings 14 remote from the tube 12 are coupled to appropriate components (not shown), and the clamps 16 are secured to a supporting frame of a structure (not shown).

The composite tube 12 includes a first end 20 and a second end 22. As used herein, the term "end" is intended broadly to encompass the extreme end as well as portions of the tube 12 adjacent the extreme end. As shown in FIG. 2, the tube 12 in this embodiment is tubular, and it includes an internal surface 24. In this example, the tube 12 is circularly symmetrical about a longitudinal axis 26. Other geometrics are possible, such as a hexagonal cross-section for the inner and/or outer surfaces of the tubular tube.

The fittings 14 are identical in this example, and an inner portion of one of the fittings 14 is shown in FIG. 2 in cross section. As shown in FIG. 2, each fitting 14 includes a groove 30, an outer cylindrical surface 39, a conical surface 41, and an anchoring surface 40 that extends onto an anchoring member 32 thereby defining the groove 30. In this example, the groove 30 is annular and is disposed radially outwardly from the anchoring member 32 that is provided with the anchoring surface 40. As shown, the end 20 of the tube 12 is coupled to the fitting 14 via the groove 30, and the anchoring surface 40. As shown therein, the tube 12 and the fitting 14 are assembled so that after assembly, the tube 12 and fitting 14 are generally coaxial. A portion of the fitting 14 forms an abutment surface 34 designed to secure and locate the composite support 10. Note that the tube 12 has an outer diameter 35 that is larger than a first diameter 37 of the anchoring surface 40 but smaller than a second diameter 38 of the anchoring surface 40, thereby allowing the anchoring surface 40, at least in part, to be located radially around the tube 12. In the example of FIG. 2, the engagement of the fitting 14 and the securing member 16 prevents the composite support 10 from moving. The securing member 16 located at the other end of the composite tube 12 similarly restricts motion of the composite support 10.

It is not essential in all embodiments that the tube 12 be straight as shown in FIG. 1. Depending upon the application, it may be preferable to provide other configurations for the tube, as shown for example in FIG. 3. As shown in therein, the tube 12 is provided with a shaped surface 48 that is angled relative to the axis 26 of the tube.

In order to minimize weight and cost of the tube 12, it is preferred to orient the fibers of the tube 12 to carry the torsional and bending loads applied to the tube 12 efficiently. In particular, the tube 12 acts as a torsion bar in both the counterclockwise and the clockwise directions, and it is therefore preferred to include fibers oriented at an angle to the longitudinal axis 26 (FIG. 2). Also, bending forces are applied to the tube 12 and it is preferred to have fibers oriented generally parallel to the longitudinal axis 26 to resist these bending loads.

In one example, the tube 12 is formed from many layers of substantially unidirectional fibers. In one example, 32 separate layers are placed around a mandrel. The mandrel is provided with a release agent, such that the mandrel can be removed after the tube is formed. Each of the layers in this example is made up of substantially unidirectional fibers impregnated in a resin binder that is baked in an oven so that the resin is cured. For example, each layer can be approximately 0.006 inch thick with the density of about 0.055 lbs/cubic inch.

In this example, the 32 separate layers are oriented as set out in Table 1. In Table 1, layer 1 is the radially innermost layer, and layer 32 is the radially outermost layer.

TABLE 1

| Layer No. | Fiber Angle |
| --- | --- |
| 1, 3, 5, 7, 13, 15, 21, 23, 29, 31 | +45° |
| 2, 4, 6, 8, 14, 16, 22, 24, 30, 32 | −45° |
| 9–12, 17–20, 25–28 | 0° |

Figure 4:
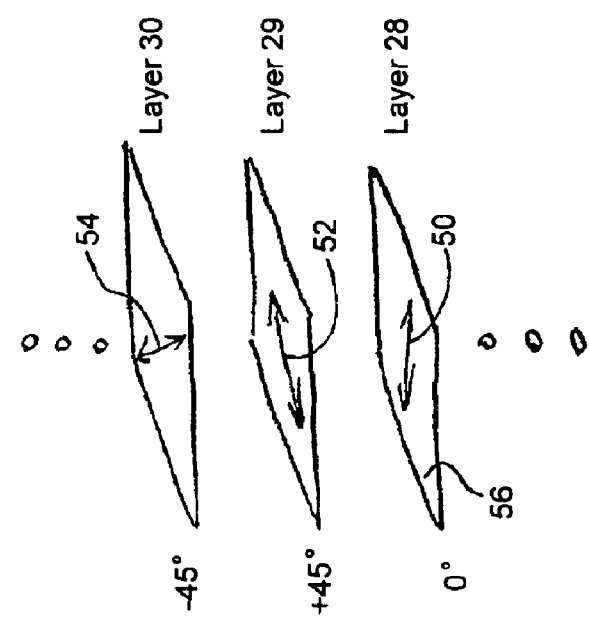
FIG. 4 is a schematic diagram illustrating three layers of fibers in the composite tube of FIGS. 1 and 2.

FIG. 4 provides a schematic representation of three of the layers 28, 29 and 30. Note that the fibers of layer 28 are included in a first set of fibers oriented at 0° with respect to the longitudinal axis. In FIG. 4, these first fibers are indicated schematically at 50 and the resin binder is indicated schematically at 56. In the next layer (layer 29), fibers 52 of the second set are oriented at an angle of +45° with respect to the longitudinal axis, and in the next layer (layer 30) fibers 54 of the third set are oriented at −45° with respect to the longitudinal axis. The property-oriented fiber layers are cut to the desired width so that they can be placed about the mandrel (or about a previously applied fiber layer) without substantial gaps or overlaps. In the conventional manner, the junctions between the edges of individual fiber layers are offset circumferentially around the mandrel. Once the 32 layers have been wound on the mandrel, a covering layer 49 is spirally wound over the outermost fiber layer so that an outer surface of the composite support 10 is provided with a housing that is spirally shaped. In this example, the covering layer 49 is a cellophane strip.

It is not essential in all embodiments that the fibers be oriented precisely at 0°, +45° and −45°. In each case, a tolerance band about each direction of ±15°, more preferably ±10°, or most preferably ±5° can be used. Also, it is not essential that all of the fibers be oriented as described above. Preferably, more than 50%, more preferably more than 75% and most preferably more than 95% of the fibers are oriented in the preferred directions described above.

Many materials can be used for the composite tube, such as fiberglass, aramid fiber and other fibers. If desired, an outer layer of aramid fiber can be applied to improve impact resistance. Also, many manufacturing techniques can be used to form the composite tube 12, including the technique described above, bladder molding processes and filament winding processes.

The fittings 14 can be formed of any suitable material. Light metal alloys such as alloys including aluminum, magnesium and titanium are preferred, because they reduce the overall weight of the composite support. The cross-sectional shape of the fittings can be optimized to reduce weight, as by using an oval or an I-beam cross-sectional profile where appropriate. The fittings can be shaped in any desired manner, as for example by casting or forging. When the fittings are made of an aluminum alloy, the alloy can be anodized to avoid galvanic corrosion. Preferably, the fitting is shaped to avoid upset profiles, thereby improving the ease of manufacturing.

The fittings are assembled onto the tube ends using any suitable approach. One approach is to use radial crimping dies to deform or crimp the outermost portion of each fitting against the tube 12 and the anchoring member 32. The anchoring member 32 supports the tube end against radial collapse during the crimping operation. Such radial crimping preferably employs multiple crimping points to reduce or eliminate slipping at the joint. The anchoring member 32 can be integrally formed with the fitting 14 as shown in FIG. 2, or it can alternatively be fabricated as a separate element. Also, the anchoring member 32 may be provided with circular or non circular (e.g., hexagonal or pentagonal) cross-sectional shapes. Preferably, the cross-sectional shape of the anchoring member 32 matches the central opening of the tube 12. Other approaches to secure the fittings 14 to the tube 12 can be used. If desired, a sealing material such as silicone or an adhesive can be used to bond and seal the joint between the fitting and the tube. This provides the tube and the fitting with a housing that reduces water seepage and thereby improves the joint. In such an arrangement, the housing in effect includes a spirally shaped portion and a silicone sealing material.

The composite support described above provides important advantages. It is unusually light in weight and corrosion resistant as compared to a traditional support.

The foregoing detailed description has described only a few of the many forms that this invention can take. This detailed description is therefore intended by way of illustration. It is only the following claims, including all equivalents that are intended to define the scope of this invention.

What is claimed is:

1. A composite support comprising:
    a) a composite tube that is provided with an outer diameter and includes
        i) a first fiber layer including a resin and glass fibers that have been wound around a mandrel;
        ii) a second fiber layer including glass fibers that have been wound around the first fiber layer;
        iii) an outermost fiber layer including glass fibers that is located around the second fiber layers;
    b) a housing that is at least in part spirally shaped and located around at least a portion of the composite tube;
    c) a plurality of fittings, wherein at least one of the fittings includes an aluminum and an anchoring surface; and
    d) the anchoring surface is provided with a diameter that is smaller than the outer diameter of the composition tube and secures, at least in part, the fitting to the composite tube, so that, after assembly, the fitting and the composite tube are generally coaxial.

2. The composite support according to claim 1 wherein the housing includes a silicone.

3. The composite support according to claim 1 wherein the housing includes a cellophane.

4. The composite support according to claim 1 wherein at least one of the fittings includes a groove.

5. The composite support according to claim 1 wherein at least one of the fittings and the composite tube form a joint and the housing seals, at least in part, the joint.

6. The composite support according to claim 1 wherein at least one of the fittings is located at least in part within the housing.

7. The composite support according to claim 1 wherein the housing is spirally wrapped in one piece over the glass fibers.

8. The composite support according to claim 1 wherein at least a portion of at least one fitting is located radially about the composite tube.

9. The composite support according to claim 1 wherein a third fiber layer is located between the second fiber layer and the outermost fiber layer.

10. The composite support according to claim 9 wherein at least one of the layers is oriented at an angle with respect to an axis of the composite tube that ranges from +30° to +60°.

11. The composite support according to claim 9 wherein at least one of the layers is oriented at an angle with respect to an axis of the composite tube that ranges from −30° to −60°.

12. The composite support according to claim 9 wherein at least one of the layers is oriented at an angle with respect to an axis of the composite tube that ranges from −15° to +15°.

13. A composite support comprising:
    a) a composite rod that is provided with an outer diameter and includes
        i) a first fiber layer including a resin and glass fibers that have been wound around a mandrel;
        ii) a second fiber layer including glass fibers that have been wound around said first fiber layer;
        iii) an outermost fiber layer including glass fibers that is located around said second fiber layer;
    b) a housing that includes a spirally shaped portion wrapped in one piece over said glass fibers;

c) a plurality of fittings, wherein at least one of said fittings includes an aluminum and an anchoring surface;

d) said composite rod and at least one of said fittings form a joint; and e) said anchoring surface is provided with a diameter that is smaller than said outer diameter of said composite rod and secures, at least in part, said fitting to said composite rod.

14. The composite support according to claim 13 wherein said housing includes a silicone.

15. The composite support according to claim 13 wherein said housing includes a silicone that seals at least in part said joint.

16. The composite support according to claim 13 wherein at least a portion of at least one fitting is located radially about said composite rod.

17. The composite support according to claim 13 wherein at least one of said fittings includes a groove.

18. The composite support according to claim 13 wherein a third fiber layer is located between said second fiber layer and said outer most fiber layer.

19. The composite support according to claim 13 wherein at least one of said layers is oriented at an angle with respect to an axis of said composite rod that ranges from +30° to +60°.

20. The composite support according to claim 13 wherein at least one of said layers is oriented at an angle with respect to an axis composite rod that ranges from −30° to −60°.

21. The composite support according to claim 13 wherein at least one of the layers is oriented at an angle with respect to an axis of the composite rod that ranges from −15° to +15°.

22. A composite support comprising:

a) a composite tube that is provided with an outer diameter and includes i) a first fiber layer including a resin and glass fibers that have been wound around a mandrel;

ii) a second fiber layer including glass fibers that have been wound around the first fiber layer;

iii) an outermost fiber layer including glass fibers that is located around the second fiber layer;

b) a plurality of fittings, wherein at least one of the fittings includes an aluminum and an anchoring surface and at least one of the fittings is located at least in part within the housing;

c) the composite tube and at least one of the fittings form a joint;

d) the anchoring surface is provided with a diameter that is smaller than the outer diameter of the composite tube and secures, at least in part, the fitting to the composite tube, so that, after assembly, the fitting and the composite tube are generally coaxial; and e) a housing that includes a spirally shaped portion wrapped in one piece over the glass fibers and further includes a silicone that seals the joint.

23. The composite support according to claim 22 wherein an adhesive secures, at least in part, at least one of the fittings to the composite tube.

24. The composite support according to claim 23 wherein at least a portion of at least one fitting is located radially about the composite tube.

25. A composite support comprising:

a) a composite tube that is provided with an outer diameter and includes i) a first fiber layer including a resin and glass fibers that have been wound around a mandrel;

ii) a second fiber layer including glass fibers that have been wound around the first fiber layer;

iii) an outermost fiber layer including glass fibers that is located around the second fiber layer;

b) a housing that is at least in part spirally shaped and located around at least a portion of the composite tube;

c) a plurality of fittings, wherein at least one of the fittings includes an aluminum and an anchoring surface that is located, at least in part, radially around the composite tube and that includes a diameter that is smaller than the outer diameter of the composite tube; and d) the anchoring surface secures, at least in part, the fitting to the composite tube, so that, after assembly, the fitting and the composite tube are generally coaxial.

26. A composite support comprising:

a) a composite tube that is provided with an outer diameter and includes i) a first fiber layer including a resin and glass fibers that have been wound around a mandrel;

ii) a second fiber layer including glass fibers that have been wound around the first fiber layer;

iii) an outermost fiber layer including glass fibers that is located around the second fiber layers;

b) a housing that is at least in part spirally shaped and located around at least a portion of the composite tube;

c) a plurality of fittings, wherein at least one of the fittings includes an aluminum and an anchoring surface that secures, at least in part, the fitting to the composite tube, so that, after assembly, the fitting and the composite tube are generally coaxial; and d) the anchoring surface is provided with a first diameter and a second diameter, wherein the outer diameter of the composite tube is larger than at least one of the diameters.

27. The composite support according to claim 26, wherein the outer diameter of the composite tube is larger than the first diameter of the anchoring surface and smaller than the second diameter of the anchoring surface.

* * * * *